(12) United States Patent
Gerez et al.

(10) Patent No.: US 9,097,575 B2
(45) Date of Patent: Aug. 4, 2015

(54) METHOD AND DEVICE FOR MONITORING TORSIONAL VIBRATIONS OF A ROTARY SHAFT OF A TURBINE ENGINE

(75) Inventors: Valerio Gerez, Yerres (FR); Julien Christian Pascal Griffaton, Paris (FR); Edouard Joseph Jadczak, Le Mee sur Seine (FR)

(73) Assignee: SNECMA, Paris (FR)

( * ) Notice: Subject to any disclaimer, the term of this patent is extended or adjusted under 35 U.S.C. 154(b) by 288 days.

(21) Appl. No.: 13/512,765

(22) PCT Filed: Nov. 22, 2010

(86) PCT No.: PCT/FR2010/052467
§ 371 (c)(1),
(2), (4) Date: May 30, 2012

(87) PCT Pub. No.: WO2011/064490
PCT Pub. Date: Jun. 3, 2011

(65) Prior Publication Data
US 2012/0229290 A1    Sep. 13, 2012

(30) Foreign Application Priority Data
Nov. 30, 2009    (FR) ...................................... 09 58527

(51) Int. Cl.
G08B 21/00    (2006.01)
G01H 1/00    (2006.01)
(52) U.S. Cl.
CPC ..................................... *G01H 1/006* (2013.01)
(58) Field of Classification Search
None
See application file for complete search history.

(56) References Cited

U.S. PATENT DOCUMENTS

| | | | | |
|---|---|---|---|---|
| 4,408,294 A | * | 10/1983 | Imam | 702/35 |
| 5,483,833 A | * | 1/1996 | Dickens et al. | 73/583 |
| 5,501,105 A | * | 3/1996 | Hernandez et al. | 73/660 |
| 5,686,669 A | * | 11/1997 | Hernandez et al. | 73/660 |
| 6,370,482 B1 | * | 4/2002 | Wirth | 702/56 |
| 6,729,186 B1 | * | 5/2004 | Sirrine et al. | 73/660 |
| 7,102,379 B2 | * | 9/2006 | Hobelsberger et al. | 324/765.01 |

(Continued)

FOREIGN PATENT DOCUMENTS

| CN | 1926413 A | 3/2007 |
|---|---|---|
| JP | 2009-20090 | 1/2009 |

(Continued)

OTHER PUBLICATIONS

International Search Report Issued Feb. 3, 2011 in PCT/FR10/52467 Filed Nov. 22, 2010.

(Continued)

*Primary Examiner* — Julie Lieu
(74) *Attorney, Agent, or Firm* — Oblon, McClelland, Maier & Neustadt, L.L.P.

(57) ABSTRACT

A method of monitoring twisting vibration of a rotary shaft of a turbine engine includes obtaining a vibratory acceleration signal from a sensor located on a stationary component of the turbine engine. This vibratory signal is characterized by a carrier frequency. The method also includes evaluating a frequency spectrum of the vibratory signal and searching for a pair of spectral lines of amplitudes greater than at least a first threshold. The lines are distributed in the spectrum on either side of the carrier frequency of the vibratory signal, and spaced apart therefrom by a twisting frequency of the shaft. Where appropriate, the method includes issuing a warning message.

10 Claims, 6 Drawing Sheets

(56) References Cited

U.S. PATENT DOCUMENTS

| | | | |
|---|---|---|---|
| 7,117,744 B2 * | 10/2006 | Hobelsberger et al. | 73/660 |
| 7,693,673 B2 * | 4/2010 | Luo et al. | 702/99 |
| 8,272,265 B2 * | 9/2012 | Bucher et al. | 73/457 |
| 8,589,136 B2 * | 11/2013 | Ertas et al. | 703/10 |
| 2005/0171736 A1 | 8/2005 | Kang | |
| 2005/0183504 A1 * | 8/2005 | Hobelsberger et al. | 73/593 |

FOREIGN PATENT DOCUMENTS

| | | |
|---|---|---|
| WO | 96 05486 | 2/1996 |
| WO | 03 073050 | 9/2003 |

OTHER PUBLICATIONS

Combined Office Action and Search Report issued Jul. 18, 2013 in Chinese Application No. 201080054361.4 (With English Translation and English Translation of Category of Cited Documents).

Jiahong Wang, "Fault Diagnosis Theory and Research on Its Use Based on Torsional Vibrations of Shaft of Diesel Engine," Chinese Doctoral Dissertations & Master's Theses, 1 Engineering Science and Technology II, (Jun. 15, 2002).

Office Action issued in Chinese Application No. 201080054361.4 on Nov. 3, 2014 (English Translation).

* cited by examiner

METHOD AND DEVICE FOR MONITORING TORSIONAL VIBRATIONS OF A ROTARY SHAFT OF A TURBINE ENGINE

BACKGROUND OF THE INVENTION

The present invention relates to the general field of turbine engines.

It relates more particularly to monitoring aviation turbine engines fitted with one or more rotary shafts, e.g. such as a turbojet or a turboprop.

In known manner, a rotary shaft of a turbojet, such as for example a low-pressure rotor, is subjected to a steady twisting force.

In addition, specific excitations may dynamically generate vibration in the rotary shaft at a particular frequency that is known as the twisting frequency of the shaft. This particular frequency characterizes the first twisting mode of the shaft. By way of example, for a low-pressure rotor of a turbojet, this frequency is low compared with the frequency of rotation of the rotor.

It can thus happen that pulsed injection of fuel into the turbojet enters into resonance with this first twisting mode of the turbojet shaft. Depending on the amplitude of this resonance, noise may be generated in the cabin, or there may be a risk of the shaft breaking as the result of vibration fatigue.

It is therefore necessary to monitor twisting vibration of the rotary shaft of a turbojet in order to avoid such drawbacks.

OBJECT AND SUMMARY OF THE INVENTION

An object of the invention is thus to propose a reliable method of monitoring twisting vibration of a rotary shaft of a turbine engine by using signals derived from sensors that are already present in the turbine engine.

This object is achieved by a method of monitoring twisting vibration of a rotary shaft of a turbine engine, the method comprising:
  a step of obtaining a vibratory acceleration signal from a sensor located on a stationary component of the turbine engine, this vibratory signal being characterized by a carrier frequency;
  a step of evaluating a frequency spectrum of the vibratory signal;
  a step of searching for a pair of spectral lines of amplitudes greater than at least a first threshold, the lines being distributed in the spectrum on either side of the carrier frequency of the vibratory signal, and spaced apart therefrom by a twisting frequency of the shaft; and
  where appropriate, a step of issuing a warning message.

Correspondingly, the invention also provides a monitoring device for monitoring twisting vibration of a rotary shaft of a turbine engine, the device comprising:
  obtaining means for obtaining a vibratory acceleration signal from a sensor located on a stationary component of the turbine engine, the vibratory signal being characterized by a carrier frequency;
  evaluation means for evaluating a frequency spectrum of the vibratory signal;
  search means for searching for a pair of spectral lines of amplitudes greater than at least a first threshold, the lines being distributed in the spectrum on either side of the carrier frequency of the vibratory signal, and spaced apart therefrom by a twisting frequency of the shaft; and
  issuing means for issuing a warning message activated where appropriate.

In preferred but non-limiting manner, the invention applies in particular to monitoring low frequency twisting vibration of a rotary shaft of a turbine engine. The term "low frequency" is used herein to mean a frequency that is well below the frequency of rotation of the rotary shaft being monitored, e.g. a twisting frequency equal to 30% of the frequency of rotation of the shaft.

Advantageously, the invention makes it possible to use signals derived from sensors that are already present in the turbine engine, i.e. vibratory sensors such as accelerometers, strain gauges, microphones, etc., in order to monitor the twisting vibration to which the rotary shafts of the turbine engine are subjected. Appropriate processing of these signals makes it possible to issue a warning message in the event of vibration of excessive amplitude, and where appropriate to propose corrective maintenance in order to limit cabin noise, or indeed to prevent the rotary shaft from breaking.

The inventors have observed, perspicaciously, that in the presence of unbalance on the rotary shaft, observing and analyzing vibratory acceleration signals obtained from sensors located on stationary components of the turbine engine makes it possible in simple and reliable manner to identify the presence of twisting vibration of predefined levels of amplitude. In practice, however much effort is given to eliminating unbalance affecting a rotor shaft, that effort never enables unbalance to be eliminated completely. In other words, rotary shafts are never perfectly balanced, so it is always possible to monitor them by means of the invention.

The monitoring method of the invention presents the advantage of being capable of being implemented in real time or after only a short delay, e.g. in a monitoring device on board the aircraft fitted with the turbine engine. The monitoring device may in particular be incorporated in the turbine engine, and more precisely in the device for monitoring the turbine engine, commonly known as an engine monitoring unit (EMU).

In a variant, the monitoring device may be placed in the ancillary equipment bench under the wing of the aircraft together with the equipment specifically dedicated to monitoring the turbine engine.

In yet another variant, the monitoring method may be implemented in a device on the ground that is dedicated to monitoring the turbine engine.

It should be observed that the method of the invention may be combined easily with other detection methods in order to increase the reliability of detection, and thereby improve the maintenance diagnosis delivered to the final user of the turbine engine.

In a turbine engine, the main source of unbalance is the fan. Nevertheless, it is common for the engine turbine itself also to introduce unbalance. Under such circumstances, there is a combination of unbalances that oscillate in phase opposition.

In a particular implementation, the invention advantageously relies on this observation to associate a confidence level with the warning message. For this purpose, the monitoring method also comprises:
  a step of evaluating an envelope signal of the vibratory signal;
  a step of evaluating a frequency spectrum of the envelope signal;
  a search step of searching for at least one spectral line in the spectrum of the envelope signal that has an amplitude greater than a second threshold, and that exists at a multiple of the twisting frequency of the shaft; and
  a step of estimating a confidence level associated with the warning message as a function of the result of the search step.

Correspondingly, with this implementation, the monitoring device may also comprise:

- evaluation means for evaluating an envelope signal of the vibratory signal;
- evaluation means for evaluating a frequency spectrum of the envelope signal;
- search means for searching for at least one spectral line in the spectrum of the envelope signal that is of an amplitude greater than a second threshold, and that is at a multiple of the twisting frequency of the shaft; and
- estimator means for estimating a confidence level associated with the warning message, as a function of the result of the search.

The envelope signal may be obtained for example from a signal that is the result of applying a Hilbert transform to the vibratory signal.

Thus, preferably, in this particular implementation, a higher confidence level is given to the warning message when a line of amplitude greater than the second threshold is identified in the spectrum of the envelope signal at a multiple of the twisting frequency of the shaft. Detecting such lines thus serves to confirm the warning issued relating to twisting vibration of the rotary shaft.

Nevertheless, it may be observed that the absence of any lines in the envelope spectrum does not invalidate the warning that has been issued as a result of the first threshold being exceeded by the spectral lines in the spectrum of the vibratory signal.

In a particular implementation, the monitoring method also comprises:

- a search step of searching for at least one other pair of spectral lines distributed in the spectrum of the vibratory signal on either side of the carrier frequency and spaced apart therefrom by a multiple of the twisting frequency of the shaft; and
- a step of estimating a level of severity associated with the warning message, this level of severity depending on the number of pairs of lines that are found in the search step and that are of amplitudes that exceed at least a third threshold.

Correspondingly, with this implementation, the monitoring device also comprises:

- search means for searching for at least one other pair of spectral lines distributed in the spectrum of the vibratory signal on either side of the carrier frequency, and spaced apart therefrom by a multiple of the twisting frequency of the shaft; and
- estimator means for estimating a severity level associated with the warning message, the severity level depending on the number of pairs that are found by the search means and that are of amplitudes that exceed at least a third threshold.

In another aspect of the invention, the invention also provides a turbine engine including:

- a monitoring device in accordance with the invention; and
- an accelerometer located on a stationary component of the turbine engine and adapted to deliver a vibratory acceleration signal to the monitoring device.

By way of example, such a turbine engine is a turbojet.

In a particular implementation, the various steps of the monitoring method are determined by computer program instructions.

Consequently, the invention also provides a computer program on a data medium, the program being suitable for being implemented in a monitoring device, or more generally in a computer, the program including instructions adapted to implementing the steps of a monitoring method as described above.

The program may make use of any programming language, and it may be in the form of source code, object code, or of code intermediate between source code and object code, such as in a partially compiled form, or in any other desirable form.

The invention provides a computer readable data medium including computer program instructions as mentioned above.

The data medium may be any entity or device capable of storing the program. For example, the medium may comprise storage means, such as read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF AN EMBODIMENT

The invention relates to monitoring a turbine engine, and more particularly to monitoring the twisting vibration to which a rotary shaft of the turbine engine is subjected in operation.

The principle on which the invention is advantageously based is that twisting vibration of a rotary shaft of a turbine engine around its operating speed, and in the presence of unbalance on the rotor associated therewith, generates frequency and possibly also amplitude modulation of the vibratory signals delivered by vibration sensors placed on stationary elements of the turbine engine. Thus, the invention makes use of the fact that, by observing and analyzing these vibratory signals, it is possible to identify twisting vibration that is of an amplitude that is excessive.

As mentioned above, in practice, it is not possible to balance the rotary shafts of a turbine engine perfectly, such that those shafts are always subject to some unbalance. There is therefore no obstacle, properly speaking, to implementing the invention.

In a turbine engine, the main source of unbalance is the fan. Nevertheless, it often happens that the turbine also gives rise to unbalance, oscillating in phase opposition with the unbalance that exists in the plane of the fan. The invention is advantageously applicable under both of those circumstances.

Figure 1:
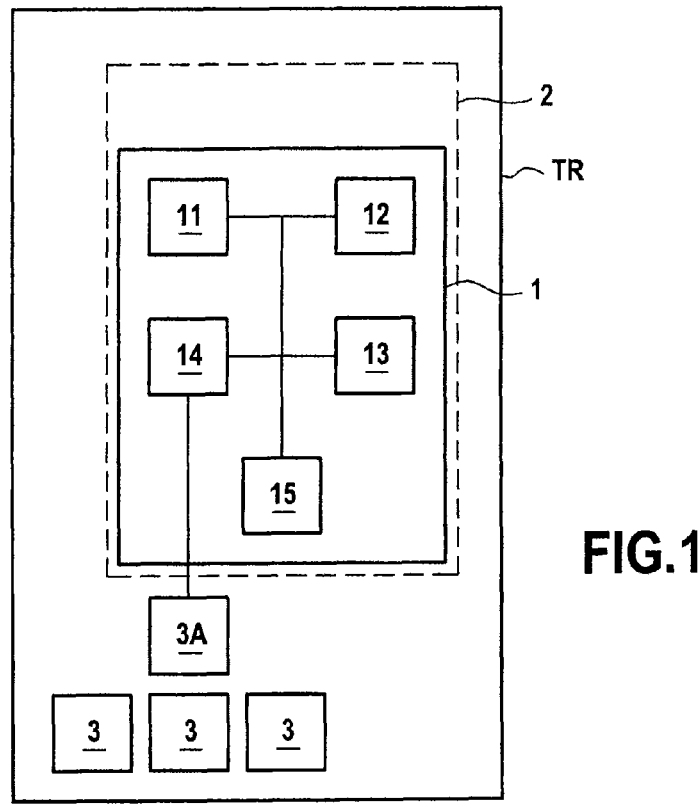
FIG. 1 is a diagram of the monitoring device in accordance with the invention, in a particular embodiment.

Reference is made below to FIG. 1, which shows a particular embodiment of a monitoring device 1 in accordance with the invention, in its environment.

In this particular embodiment, it is a low-pressure rotary shaft ABP (FIG. 2) of a turbojet TR fitted to an aircraft (not shown) that is to be monitored in accordance with the invention. Nevertheless, these assumptions are not limiting, and the invention also applies to other turbine engines, such as for example a turboprop.

In the embodiment described herein, the monitoring device 1 is on board the aircraft and it is incorporated in the aircraft monitoring device or EMU 2.

In a variant, the monitoring device of the invention may be placed in the ancillary equipment bench under the aircraft wing together with the equipment specifically dedicated to monitoring the turbojet TR, or it may be implemented in a device on the ground that is dedicated to monitoring the turbojet.

In known manner, the turbojet TR is provided with a plurality of operation sensors 3, such as for example sensors for sensing: position, speed, temperature, pressure, vibration, etc. These sensors are suitable for delivering various measurements to the EMU 2 so that it can monitor the operation of the turbojet TR.

Amongst these sensors, there is in particular an accelerometer 3A placed on a stationary component of the turbojet TR (e.g. at one of the bearings of the rotary shaft ABP). Such a sensor is commonly used in turbojets, or more generally in turbine engines, and it is not described in greater detail herein.

Conventionally, the accelerometer 3A is adapted to provide an electrical signal or a vibratory acceleration signal at instant $t$, which signal is written x(t) and presents a magnitude that is proportional to the measured acceleration. In this example, this electrical signal is the result of accelerations imparted to the stationary component on which the accelerometer 3A is placed as a result of there being unbalance present on the low-pressure rotary shaft of the turbojet TR while it is in operation. The signal is delivered to the EMU 2, and more particularly to the monitoring device 1.

In a variant, it should be observed that other vibration sensors could be used for delivering a vibratory signal proportional to an acceleration to the EMU 2, such as for example a microphone or a strain gauge. In the meaning of the invention, it is considered that such a signal constitutes a vibratory acceleration signal.

In this example, the monitoring device 1 presents the hardware architecture of a computer.

It comprises in particular a processor 11, a random access memory (RAM) 12, a ROM 13, and means 14 for communicating with equipment on board the aircraft, such as for example, with the accelerometer 3A. In known manner, such equipment and the monitoring device 1 of the invention are in communication via digital data buses or lines of the aircraft and known to the person skilled in the art.

The monitoring device 1 also includes means 15 for communicating with a server of the operator of the aircraft (not shown), e.g. via an aircraft communications addressing and reporting system (ACARS).

The ROM 13 includes a computer program in accordance with the invention that is adapted to execute the main steps of the monitoring method of the invention, as described below with reference to FIGS. 2 to 6.

It is assumed here that the low-pressure rotary shaft ABP being monitored presents unbalance in the plane of the fan in combination with unbalance in the plane of the turbine of the turbojet TR. Under the effect of the twisting of the shaft, these two unbalances oscillate in phase opposition.

Figure 2:
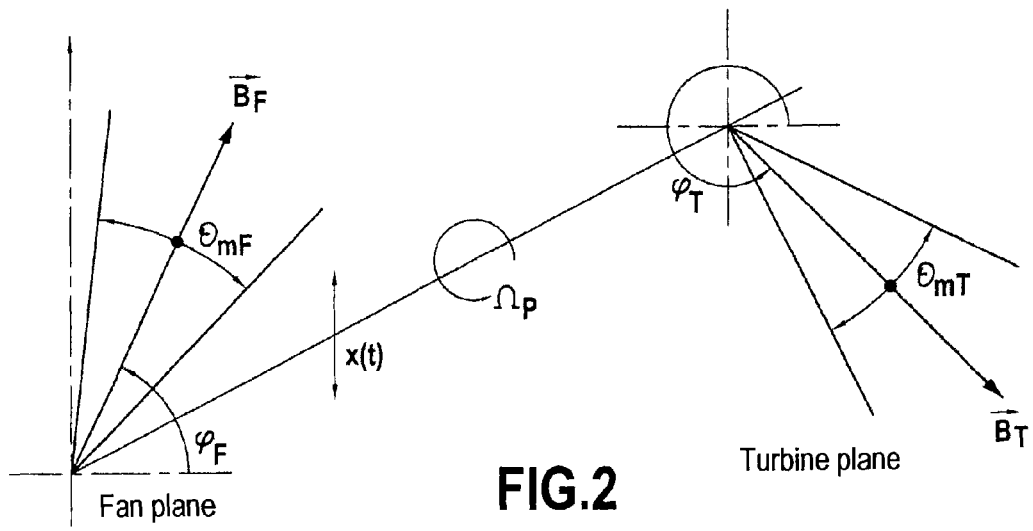
FIG. 2 is a diagram of a model proposed by the invention of an unbalance in the fan plane associated with an unbalance in the turbine plane and affecting a rotary shaft of a turbojet.

FIG. 2 shows a model in vector form of these unbalances that are written respectively $\vec{B}_F$ and $\vec{B}_T$, in the plane of the fan and in the plane of the turbine.

Given this model, the vibratory signal x(t) delivered by the accelerometer 3A at instant $t$ may be written in the following form:

$$x(t)=F\sin(\Omega_P t+\phi_F+\theta_{mF}\sin(\Omega_m t))+T\sin(\Omega_P t+\phi_T+\theta_{mT}\sin(\Omega_m t+\pi))$$

where:

$\Omega_P$ designates the carrier angular frequency carrying the vibratory signal x(t), and representative of the speed of rotation of the shaft. It should be observed that:

$$\Omega_P=2\pi F_P$$

where $F_P$ designates the carrier frequency carrying the vibratory signal;

$\Omega_m$ designates the angular frequency of the twisting of the rotary shaft. It should be observed that:

$$\Omega_m=2\pi F_m$$

where $F_m$ designates the twisting frequency of the rotary shaft. This twisting frequency is known and depends on the characteristics of the rotary shaft;

$\theta_{mF}$ and $\theta_{mT}$ designate the amplitudes of the twisting vibration respectively in the plane of the fan and in the plane of the turbine;

F and T represent the peak amplitudes of the vibratory signal x(t) delivered by the accelerometer. The amplitude F is a function of the unbalance vector $\vec{B}_F$ in the plane of the fan and of the response of the structure to the unbalance. The amplitude T is a function of the unbalance vector $\vec{B}_T$ in the plane of the turbine and of the response of the structure to the unbalance;

$\phi_F$ designates the phase position corresponding to the angular position of the unbalance vector $\vec{B}_F$ in the fan plane relative to a reference angle; and $\phi_T$ designates the phase position corresponding to the angular position of the unbalance vector $\vec{B}_T$ in the turbine plane relative to said reference angle.

Figure 3A:
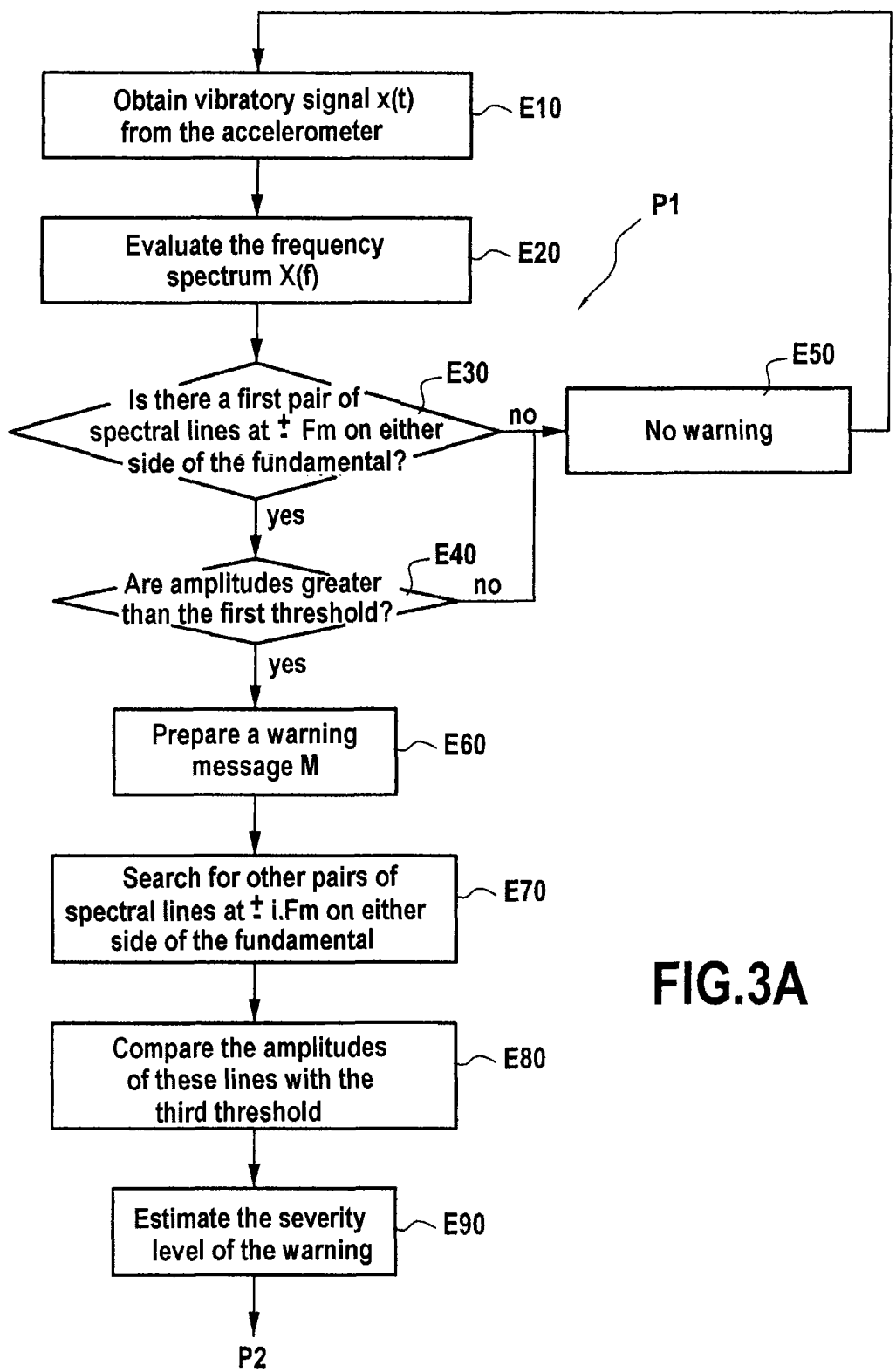
FIGS. 3A and 3B are flow charts showing the main steps of a monitoring method in accordance with the invention when implemented by the monitoring device of FIG. 1, in a particular implementation.
Figure 3B:
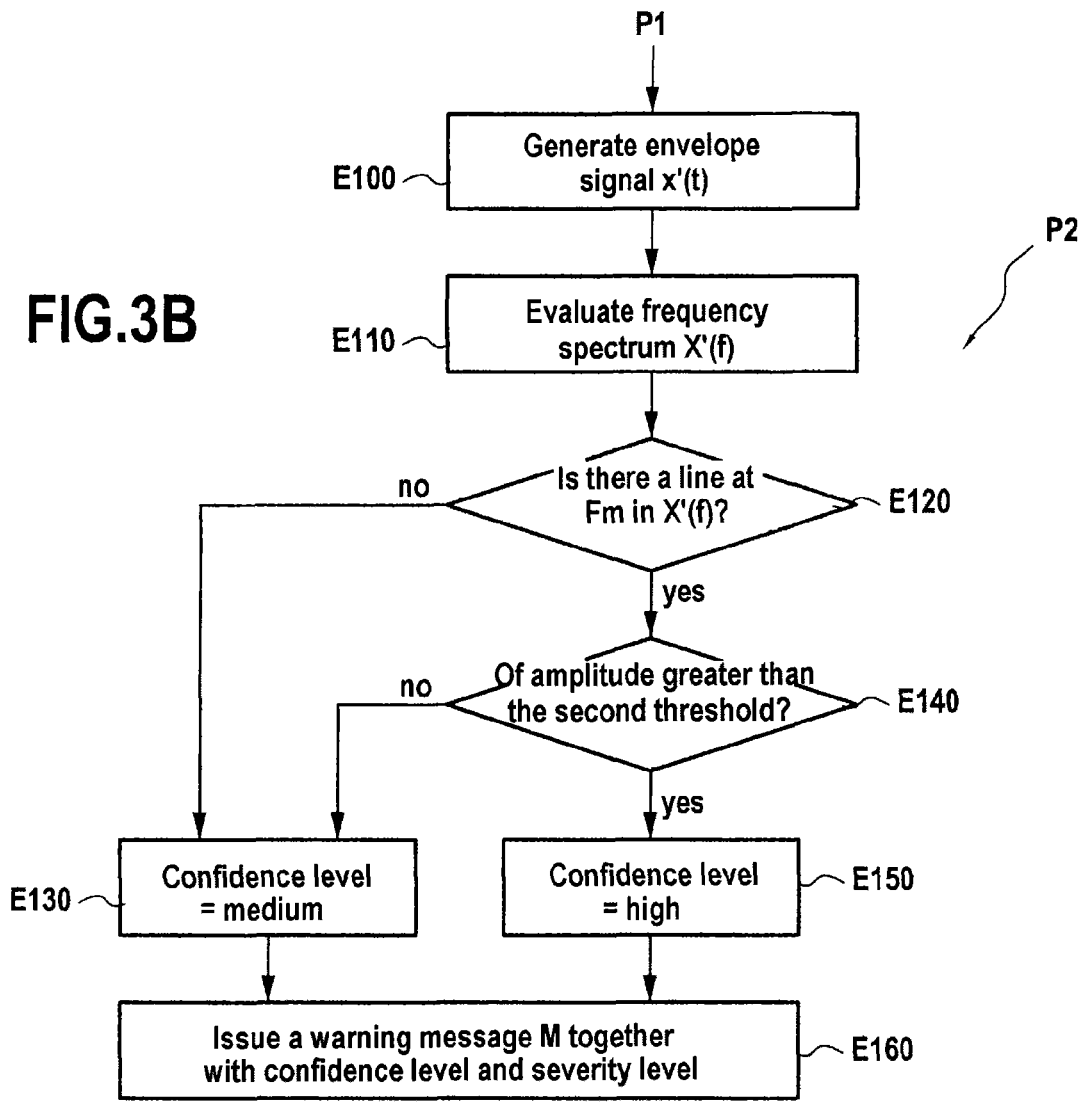

With reference to FIGS. 3A and 3B, there follows a detailed description of the main steps of the monitoring method of the invention, in a particular implementation.

In the implementation described, the monitoring method comprises two stages:

a first stage P1 (shown in FIG. 3A) during which the presence of twisting vibration in the rotary shaft ABP is detected, and where appropriate, the amplitude of said vibration is monitored and its severity is evaluated; and a second stage P2 (shown in FIG. 3B) that is implemented in this example only if a twisting vibration of excessive amplitude is detected during the stage P1, and during which a confidence level is associated with the detection.

Thus, during the stage P1, the vibratory acceleration signal x(t) from the sensor 3A is delivered continuously via the communications means 14 to the monitoring device 1 and is stored in the RAM 12 (step E10).

Figure 4A:
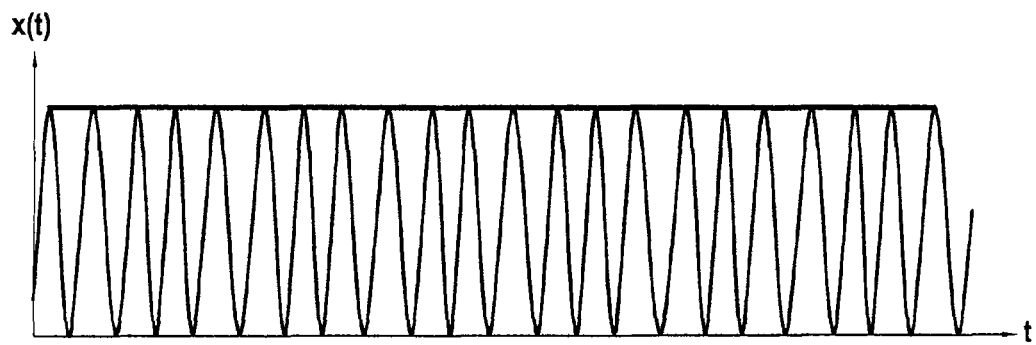
FIGS. 4A to 4C show examples of vibratory signals x(t)
Figure 4B:
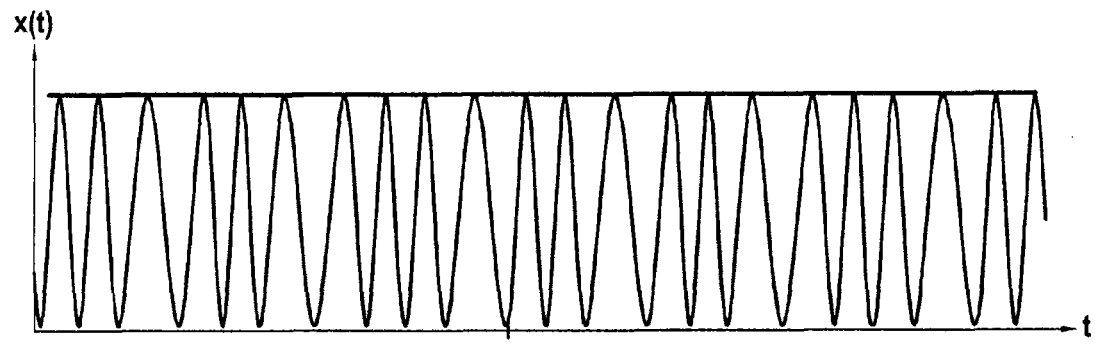
Figure 4C:
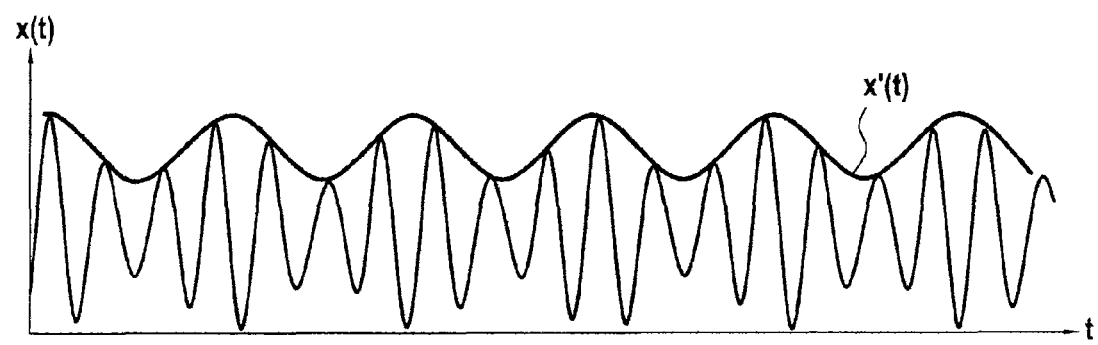

As an indication, FIGS. 4A to 4C show the appearance of the signal x(t) for the following examples:

FIG. 4A shows a signal x(t) obtained when the unbalance in the turbine plane is zero or quasi-zero (i.e. T≈0), and for twisting vibration of small amplitude (here of the order of a few degrees);

FIG. 4B shows a signal x(t) obtained when the unbalance in the turbine plane is zero or quasi-zero (i.e. T≈0), for twisting vibration of large amplitude; and FIG. 4C shows a signal x(t) obtained in the presence of unbalance in the turbine plane and unbalance in the fan plane.

As shown in these figures, the signal x(t) is not sinusoidal, but presents asymmetries relative to its carrier frequency $F_P$.

These asymmetries are characterized by the existence of pairs of sideband spectral lines in the frequency spectrum of the signal x(t) that are distributed symmetrically about the fundamental line $R_0$ that is associated with the unbalance(s) of greater or smaller amplitude(s).

In accordance with the invention, analyzing the quantity and the amplitudes of these sideband lines present in the frequency spectrum of the signal x(t) makes it possible to identify the presence of twisting vibration of excessive amplitude and to determine the severity of the phenomenon as identified in this way.

Thus, the frequency spectrum of the signal x(t) stored in the memory 12 is evaluated (step E20). This frequency spectrum is written X(f) where $\underline{f}$ designates frequency. In the example described, X(f) is obtained by evaluating the Fourier transform of the signal x(t) taken over a time window written W and of predetermined length. Obtaining the frequency spectrum of a time-varying signal is itself known and is not described in greater detail herein.

Figure 5A:
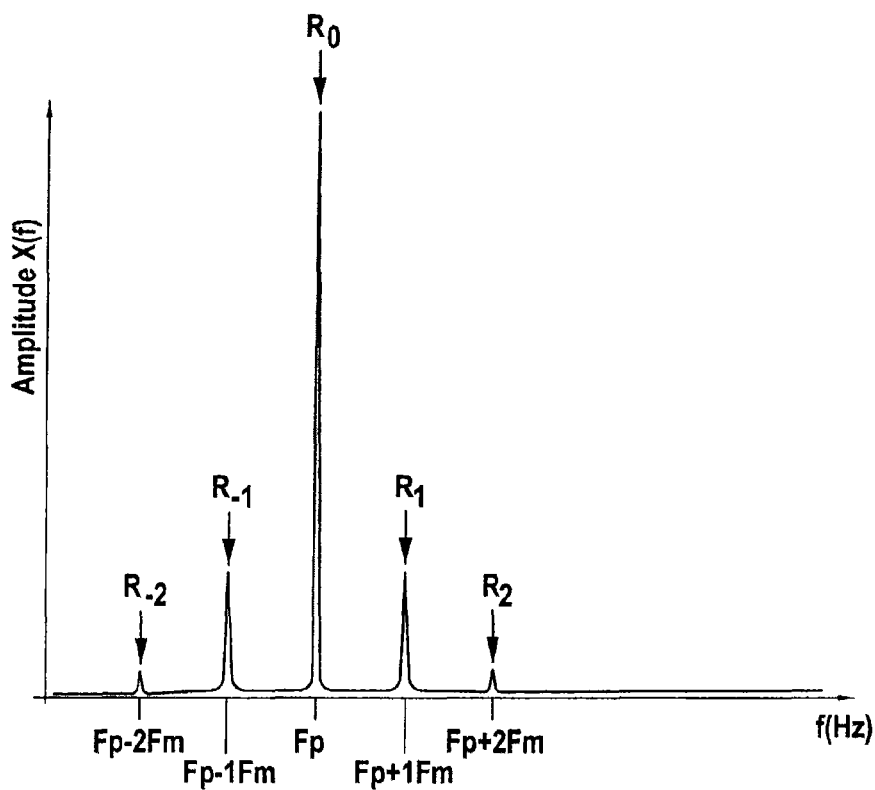
FIGS. 5A to 5C show the frequency spectra of the vibratory signals shown in FIGS. 4A to 4C, respectively.
Figure 5B:
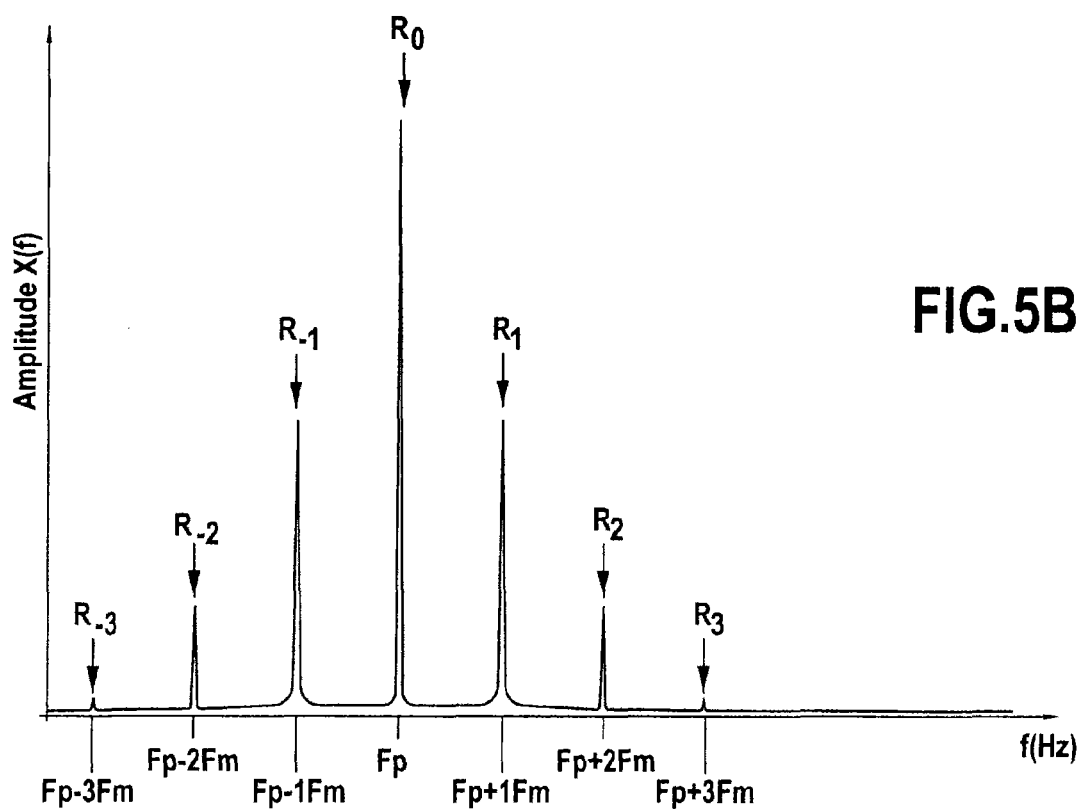
Figure 5C:
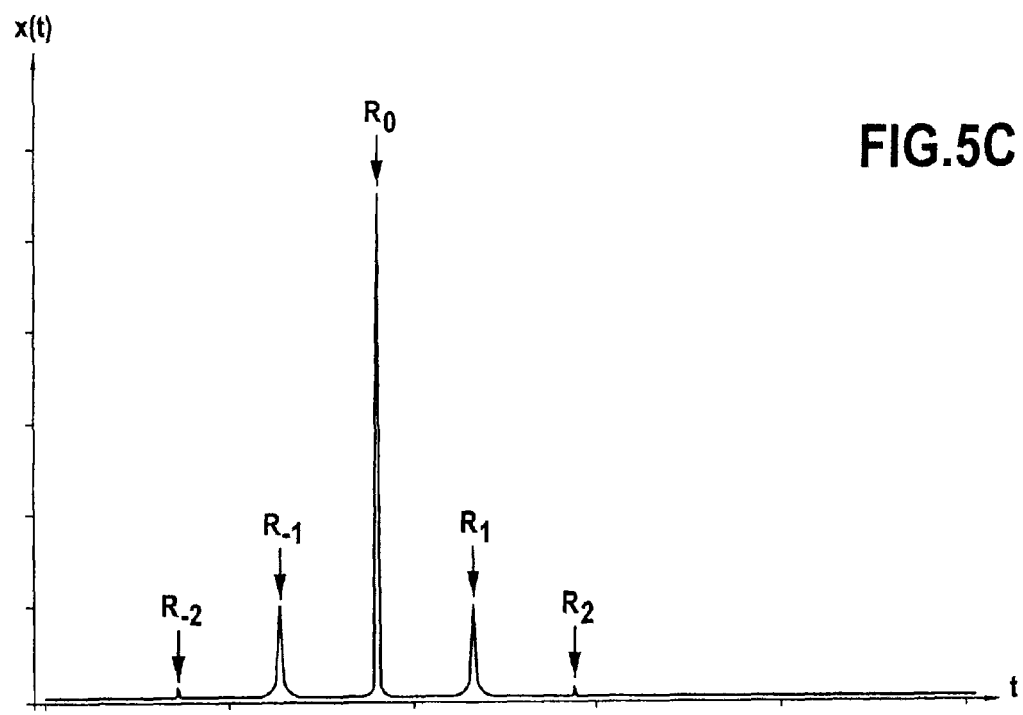

By way of example, FIGS. 5A, 5B, and 5C show the spectra X(f) of the signals x(t) as shown respectively in FIGS. 4A, 4B, and 4C.

In these spectra, it can be seen that pairs of sideband lines are present that are located on either side of the fundamental line, which is situated at the carrier frequency $F_P$, and that are spaced apart therefrom by the twisting frequency $F_m$. These pairs of lines are of varying amplitudes. $R_i$ and $R_{-i}$ designate the pair of spectral lines present at the frequencies $F_i$ and $F_{-i}$ and satisfying:

$$F_i = F_p + i \times F_m$$

and $$F_{-i} = F_p - i \times F_m$$

where $\underline{i}$ is an integer.

In accordance with the invention, a search is made initially for the presence of a first pair of sideband lines situated at the frequencies $\pm F_m$ on either side of the fundamental line $R_0$ (step E30).

This search is performed using techniques that are known to the person skilled in the art. For example, the values taken by the spectrum X(f) in a predetermined range selected around the frequencies $\pm F_m$ are compared with a threshold representative of a noise level.

If the search does not enable lines to be detected at the frequencies $\pm F_m$, then it is deduced that the first twisting mode of the shaft is not excited. As a result, no warning is issued (step E50). A new window W of the vibratory signal x(t) is then selected and the steps E20 and E30 are reiterated over this new window.

Otherwise, if a first pair of sideband lines $R_1$ and $R_{-1}$ is detected at the frequencies $\pm F_m$ during the search step, then the amplitude of these lines is determined thereafter. This amplitude is given by the values of the lines in the spectrum X(f).

Thereafter, the relative amplitudes of the first pair of lines $R_1$ and $R_{-1}$ as determined in this way are each compared with a predefined threshold $S1_1$ (step E40). The term "relative amplitude" is used herein to mean the ratio of the amplitude of the line under consideration over the amplitude of the fundamental $R_0$.

In a variant, it is also possible to compare the "absolute" amplitudes of the lines $R_1$ and $R_{-1}$ directly with a predefined threshold.

The threshold $S1_1$ constitutes a first threshold in the meaning of the invention. It is predefined, and in this example it is representative of the relative amplitude of the sideband lines beyond which twisting vibration is worrying and requires a warning to be issued, or a maintenance operation to be planned. This threshold is determined in experimental manner.

In a variant implementation, it should be observed that steps E30 and E40 may be implemented simultaneously, by searching for the first pair of lines directly using the threshold $S1_1$.

If at least one relative amplitude of the lines $R_1$ and/or $R_{-1}$ is less than the threshold $S1_1$, then it is considered that there is no need to issue a warning (step E50): a new window W of the vibratory signal x(t) is then selected and the steps E20 to E40 are repeated over this new window.

If, on the contrary, both relative amplitudes of the lines $R_1$ and $R_{-1}$ are each greater than the first threshold $S1_1$, then it is decided to issue a warning message M (step E60).

In the implementation described herein, this warning message M is associated with two additional items of information that characterize the warning, namely firstly a severity level of the warning and secondly a confidence level of the warning.

In a variant implementation, the warning message M is associated with one or other of these items of information.

In another variant implementation, the warning message M is sent as soon as it is detected that the amplitudes of the lines $R_1$ and $R_{-1}$ cross the first threshold, without this information being associated with the warning.

In order to evaluate the severity level of the warning, a search is made in the spectrum of the signal x(t) to see whether other pairs of sideband lines (e.g. $R_2/R_{-2}$, $R_3/R_{-3}$, etc.) are present on either side of the fundamental $R_0$, at multiples of the twisting frequency of the shaft ABP, and the amplitudes of these pairs of lines are determined (step E70).

Only lines of amplitude greater than a predetermined noise level are taken into consideration.

The relative amplitudes of these lines are then compared with respective predetermined thresholds ("third" thresholds in the meaning of the invention) (step E80).

For example, with reference to FIG. 5A, the relative amplitudes of the lines $R_2$ and $R_{-2}$ are compared with a threshold $S1_2$. The threshold $S1_2$ is selected to be distinct from the threshold $S1_1$.

In a variant, the thresholds $S1_1$ and $S1_2$ could be identical. It should also be observed that the respective amplitudes of each line in a pair of lines may also be compared with different respective thresholds.

After this comparison, the monitoring device 1 evaluates the number N of pairs of sideband lines that are distributed symmetrically on either side of the fundamental $R_0$ at multiples of the twisting frequency of the shaft, and for which the amplitudes exceed the third thresholds (step E90).

This number N constitutes an estimate of the severity level of the warning in the meaning of the invention: the greater the value of N, the more the twisting vibration phenomenon to which the shaft ABP is subjected is considered to be severe.

In the example of FIG. 4A, it is assumed that this number is equal to 2, because it includes the pair of lines at $\pm F_m$ and the pair of lines at $\pm 2F_m$.

The number N is then inserted in a predetermined field of the message M.

Following this first stage P1, a second stage P2 is implemented in order to associate a confidence level with the warning message M (FIG. 3B).

For this purpose, in the implementation described herein, a search is made in the signal x(t) for the presence of a characteristic that would corroborate the warning identified during stage P1, i.e. the presence of amplitude modulation in the signal x(t).

FIG. 4C shows an example of a signal x(t) in which there can be observed not only asymmetries about the carrier frequency $F_p$, but also the presence of amplitude modulation.

Thus, during the stage P2, the monitoring device 1 generates an envelope signal x'(t) from the time series signal x(t) (step E100).

To do this, the Hilbert transform $\tilde{x}(t)$ of the signal x(t) is evaluated initially. Calculating the Hilbert transform of a time series signal is itself known and is not described in greater detail herein.

The envelope signal x'(t) at the instant $t$ of the signal x(t) is then obtained using the following equation:

$$x'(t) = \sqrt{x^2(t) + \tilde{x}^2(t)}$$

It should be observed that the frequency of the envelope signal x'(t) is the twisting frequency $F_m$ of the rotor shaft.

The spectrum of the envelope signal x'(t), written X'(f) where $f$ designates frequency, is then evaluated by the monitoring device, using a Fourier transform, as described above for the spectrum X(f) (step E110).

Figure 6:
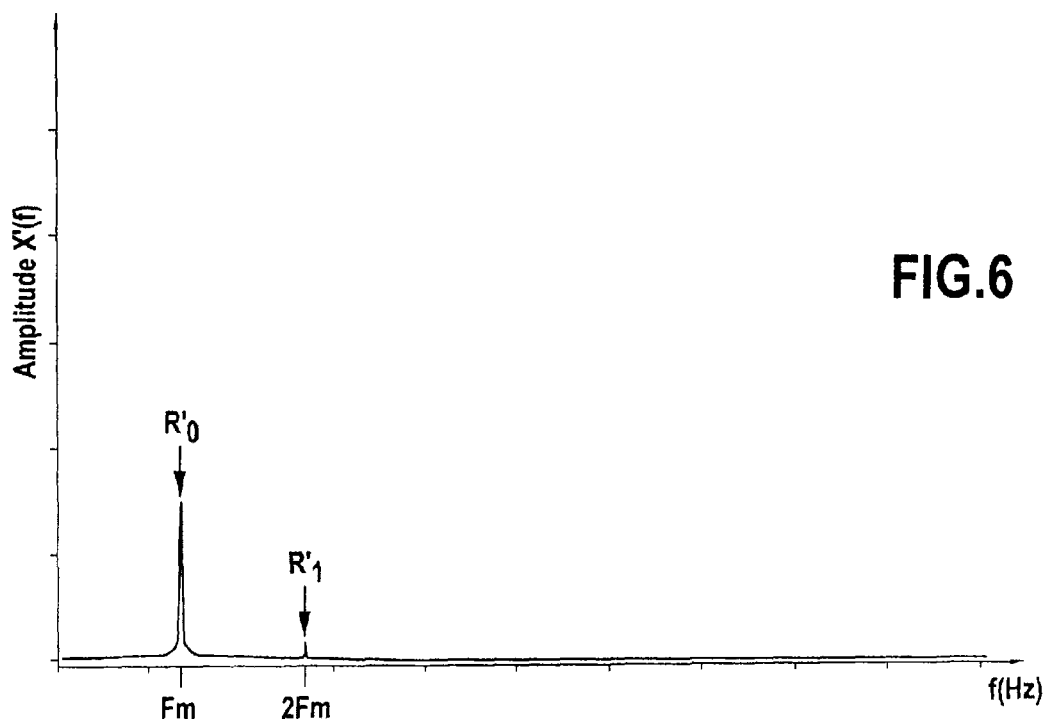
FIG. 6 shows the envelope spectrum of the vibratory signal shown in FIG. 4C.

FIG. 6 shows the spectrum of the envelope signal x'(t) corresponding to the signal x(t) shown in FIG. 4C. A fundamental spectral line $R'_1$ at the twisting frequency $F_m$, and a harmonic $R'_2$ at the frequency $2F_m$ can be seen in the spectrum.

More generally, it should be observed that the presence of amplitude modulation is manifested by the presence in the spectrum of the envelope signal of a spectral line $R'_1$ that is said to be a fundamental line at the twisting frequency $F_m$ of the shaft, and possibly of harmonics $R'_i$ at multiples $F'_i$ of the twisting frequency, such that:

$$F'_i = i \times F_m$$

where $i$ designates an integer greater than 1.

From the spectrum X'(f), a search is thus made to see whether there exists a spectral line $R'_1$ present in the signal X'(f) at the twisting frequency $F_m$ of the shaft (step E120). This search is performed in a manner similar to search step E30.

If no line is detected (in other words if no amplitude modulation is detected in the vibratory signal x(t)), then a medium confidence level is associated by default with the warning message M (step E130). In the presently-described example, this medium confidence level is represented by a flag set to the value "medium" and included in a predetermined field of the message M.

If a line $R'_1$ is detected, then its amplitude is determined: this amplitude is given by the value of the line in the spectrum X'(f).

Thereafter, the amplitude as determined in this way is compared with a predefined threshold S2 (step E140), that is obtained in experimental manner. The threshold S2 is a "second" threshold in the meaning of the invention.

As described above with reference to steps E30 and E40, in a variant implementation, the steps E120 and E140 may be performed simultaneously, by searching for a line in the signal X'(f) at the twisting frequency $F_m$ directly with the threshold S2. If the amplitude of the line $R'_1$ is greater than the threshold S2, then a high confidence level is associated with the warning message M (step E150). In the presently described example, this high confidence level is represented by a flag set to the value "high" and included in a predetermined field of the message M.

Otherwise, a medium confidence level (i.e. the flag is set to the value "medium") is associated with the warning message M and included in the appropriate field of the message (step E130).

In other words, a high level of confidence in the meaning of the invention confirms that twisting vibration of excessive amplitude has been detected during the stage P1. Nevertheless, a medium confidence level does not mean that the detection is invalid.

Naturally, some other number of spectral lines may be taken into consideration in order to estimate the confidence level. For example, it is possible to observe the lines situated at the twisting frequency together with one or more harmonics, and to adapt the confidence level accordingly.

It should be observed that the two stages P1 (steps E10 to E90) and P2 (steps E100 to E150) may be performed equally well either simultaneously or on the contrary in succession (in any order).

At the end of steps E130 and E150, the monitoring device 1 issues the warning message M (step E160). In this example, the warning message contains the confidence level and the severity level as estimated respectively in steps E130/E150 and E90.

By way of example, this message M is sent by the means 14 to the pilot of the aircraft, in order to enable the pilot to modify the operating speed of the turbojet TR.

In a variant, the message M may be sent by the means 15 to the server of the operator of the aircraft, and it may contain an invitation to carry out a maintenance operation on the turbojet TR.

In another variant embodiment of the invention, the confidence level associated with the warning message M may be consolidated, prior to issuing the message M, with diagnoses obtained from other monitoring algorithms implemented on the turbojet.

The invention claimed is:

1. A method of monitoring twisting vibration of a rotary shaft of a turbine engine, the method comprising:
obtaining a vibratory acceleration signal from an accelerometer located on a stationary component of the turbine engine, this vibratory signal being characterized by a carrier frequency;
evaluating a frequency spectrum of the vibratory signal;
searching for a pair of spectral lines of amplitudes greater than at least a first threshold, the lines being distributed in the spectrum on either side of the carrier frequency of the vibratory signal, and spaced apart therefrom by a twisting frequency of the shaft; and
where appropriate, issuing a warning message.

2. The monitoring method according to claim 1, further comprising:
   evaluating an envelope signal of the vibratory signal;
   evaluating a frequency spectrum of the envelope signal;
   searching for at least one spectral line in the spectrum of the envelope signal that has an amplitude greater than a second threshold, and that exists at a multiple of the twisting frequency of the shaft; and
   estimating a confidence level associated with the warning message as a function of the result of the searching for the at least one spectral line in the spectrum.

3. The monitoring method according to claim 2, wherein during the evaluating the envelope signal, the envelope signal is obtained from a Hilbert transform of the vibratory signal.

4. The monitoring method according to claim 1, further comprising:
   searching for at least one other pair of spectral lines distributed in the spectrum of the vibratory signal on either side of the carrier frequency and spaced apart therefrom by a multiple of the twisting frequency of the shaft; and
   estimating a level of severity associated with the warning message, this level of severity depending on the number of pairs of lines that are found in the searching for the at least one other pair of spectral lines and that are of amplitudes that exceed at least a third threshold.

5. A computer program including instructions for executing the steps of the monitoring method according to claim 1 when said program is executed by a computer.

6. A non-transitory computer readable recording medium having recorded thereon a computer program that, when executed by a computer, causes the computer to execute the monitoring method according to claim 1.

7. A monitoring device for monitoring twisting vibration of a rotary shaft of a turbine engine, the device comprising:
   obtaining means for obtaining a vibratory acceleration signal from an accelerometer located on a stationary component of the turbine engine, the vibratory signal being characterized by a carrier frequency;
   evaluation means for evaluating a frequency spectrum of the vibratory signal;
   search means for searching for a pair of spectral lines of amplitudes greater than at least a first threshold, the lines being distributed in the spectrum on either side of the carrier frequency of the vibratory signal, and spaced apart therefrom by a twisting frequency of the shaft; and
   issuing means for issuing a warning message activated where appropriate.

8. The monitoring device according to claim 7, further comprising:
   evaluation means for evaluating an envelope signal of the vibratory signal;
   evaluation means for evaluating a frequency spectrum of the envelope signal;
   search means for searching for at least one spectral line in the spectrum of the envelope signal that is of an amplitude greater than a second threshold, and that is at a multiple of the twisting frequency of the shaft; and
   estimator means for estimating a confidence level associated with the warning message, as a function of the result of the search.

9. The monitoring device according to claim 7, further comprising:
   search means for searching for at least one other pair of spectral lines distributed in the spectrum of the vibratory signal on either side of the carrier frequency, and spaced apart therefrom by a multiple of the twisting frequency of the shaft; and
   estimator means for estimating a severity level associated with the warning message, the severity level depending on the number of pairs that are found by the search means and that are of amplitudes that exceed at least a third threshold.

10. A turbine engine, comprising:
    a monitoring device according to claim 7; and
    an accelerometer located on a stationary component of the turbine engine and adapted to deliver a vibratory acceleration signal to the monitoring device.

* * * * *